United States Patent
Burban et al.

(10) Patent No.: US 7,998,254 B2
(45) Date of Patent: Aug. 16, 2011

(54) MEMBRANE MODULE

(75) Inventors: John Henry Burban, Lake Elmo, MN (US); Jeffrey William Berg, Lino Lakes, MN (US); Brent Joseph Steffensmeier, Vadnais Heights, MN (US); Joseph Charles Tuma, Forest Lake, MN (US); Carl Matthew Geisz, St. Paul, MN (US); Craig Jonathan Cuta, Stillwater, MN (US)

(73) Assignee: Porous Media Corporation, Saint Paul, MN (US)

( * ) Notice: Subject to any disclaimer, the term of this patent is extended or adjusted under 35 U.S.C. 154(b) by 636 days.

(21) Appl. No.: 11/903,337

(22) Filed: Sep. 21, 2007

(65) Prior Publication Data

US 2008/0072754 A1 Mar. 27, 2008

Related U.S. Application Data

(60) Provisional application No. 60/846,482, filed on Sep. 22, 2006.

(51) Int. Cl.
*B01D 53/22* (2006.01)
(52) U.S. Cl. ......... 96/10; 96/4; 96/8; 96/11; 95/45; 210/321.79; 210/321.83; 210/497.1
(58) Field of Classification Search ........... 96/4, 8, 96/10, 11; 95/45; 210/321.74, 321.78, 321.79, 210/321.83, 321.87, 497.1
See application file for complete search history.

(56) References Cited

U.S. PATENT DOCUMENTS

| | | | |
|---|---|---|---|
| 4,865,736 A | 9/1989 | Coplan | |
| 4,881,955 A | 11/1989 | Bikson et al. | |
| 5,026,479 A | 6/1991 | Bikson et al. | |
| 5,411,662 A * | 5/1995 | Nicolas et al. | 210/321.8 |
| 5,837,033 A * | 11/1998 | Giglia et al. | 95/45 |
| 5,897,729 A | 4/1999 | Bikson et al. | |
| 6,585,808 B2 | 7/2003 | Burban et al. | |
| 6,616,735 B1 | 9/2003 | Burban et al. | |
| 6,779,522 B2 | 8/2004 | Smith et al. | |

* cited by examiner

Primary Examiner — Jason M Greene
(74) Attorney, Agent, or Firm — Marshall & Melhorn LLC

(57) ABSTRACT

A helically wound hollow membrane module having a core with a plurality of helically wound layers of semi-permeable hollow fibers wound on the core. The fiber wind angle with respect to any one layer of fibers may be essentially constant along the axial length of the module, except in one or both end or tubesheet regions, where the wind angle may be increased, in at least some of the layers relative to the essentially constant wind angle, to produce an area of decreasing diameter.

23 Claims, 8 Drawing Sheets

MEMBRANE MODULE

RELATED APPLICATION

This application is claiming the benefit, under 35 U.S.C. §119(e), of the provisional application filed Sep. 22, 2006 under 35 U.S.C. §111(b), which was granted Ser. No. 60/846,482. This provisional application is hereby incorporated by reference in its entirety. Provisional application Ser. No. 60/846,482 is pending as of the filing date of the present application.

TECHNICAL FIELD OF THE INVENTION

This invention generally relates to hollow fiber membrane modules for the use in gas separation or gas transfer, more specifically to an improved module design for the removal of water vapor from gas streams or for the transfer of water vapor from one gas stream to a second one.

BACKGROUND OF THE INVENTION

Water-permeable hollow fiber membrane modules have been used commercially for the dehydration of gas streams as well as for the transfer of moisture from one gas stream to another. U.S. Pat. Nos. 6,585,808 and 6,616,735 disclose membrane modules suitable for gas dehydration and are incorporated herein as references and U.S. Pat. No. 6,779,522 discloses a membrane for drying or humidifying gases. For the purpose of describing the salient features of this invention, only bore-side feed gas dehydration modules will be considered, although the membrane module design concepts are applicable to the gas separation and gas transfer applications mentioned previously. In these membrane modules, the feed gas containing the moisture to be removed flows through the lumen of the hollow fiber membranes. As the feed gas flows through the membrane lumen, moisture diffuses across the water permeable membranes to the shell side of the module. In order to maintain this process, a dry gas is injected on the shell side of the module to sweep away the water vapor that has permeated. Often this dry sweep gas is derived from the dry gas that is produced by the membrane module, although other sources may be used.

In an ideal module, not only does the lumen of each fiber receive the same amount of gas flow, but also the sweep gas is uniformly distributed around the outside of the fibers and each fiber is contacted with the same amount of sweep gas. However, in practice some degree of maldistribution of the sweep gas occurs and this results in a loss of performance. To overcome this issue, either additional membrane must be used or additional sweep gas flow must be used, both adding to the cost of the process. Thus, membrane module designers are continually developing new membrane module designs to minimize the maldistribution of the sweep flow and to maximize module performance.

Bikson in U.S. Pat. No. 4,881,955 discloses a membrane module design with improved shell side flow using hollow fibers that are helically wound around a core. However he teaches that the a limitation to this approach is that the fibers must be of essentially uniform length, defining essentially uniform length as "the active lengths of the hollow fibers of the permeator cell will vary from one another by less than about 20 percent" (col 6 lines 41-44).

In addition to performance aspects related to membrane module design, the membrane modules must have the required structural integrity for the applications. In gas drying application, the gas is at elevated pressures and can exceed several hundred psig. This pressure force is applied to the face of the tubesheet and thus the tubesheet must maintain its structural integrity at these forces and at elevated temperatures. In the process of manufacturing a membrane module, the hollow fibers are embedded in a tubesheet. The presence of the fibers in the tubesheet reduces the structural integrity of the tubesheet as the hollow fibers themselves do not add to the strength of the material to resist the pressure forces described above. In addition to the presence of the hollow fibers in the tubesheet, other components may also be present in the tubesheet which tend to reduce the strength of the tubesheet.

For example in Bikson, U.S. Pat. No. 5,026,479 an impervious layer is shown embedded in the tubesheet material. The intersection of the impervious material and the tubesheet results in a discontinuity of the tubesheet material and thus weakens the tubesheet. Thus improvements in the structural integrity of the membrane modules are continually sought.

In Giglia, et al. U.S. Pat. No. 5,837,033 there is shown a hollow fiber membrane module comprising a plurality of helically wound layers of semi-permeable hollow fibers wound on a cylindrical core pipe wherein the fiber wind angle varies across the axial length of the module in one or more layers. In one embodiment, the wind angle of the fibers in the tubesheet region differs (is smaller) than the wind angle in the active region of the module. However, in any embodiment of Giglia, the diameter of the module at the tubesheet is essentially the same as the diameter of the tubesheet. Thus, much of the area of the potting in the tubesheet is occupied by fiber ends. Therefore, the integrity of the tubesheet is compromised by this construction. Additionally, the feed gas pressure drop will be higher in this case due to the greater length of inactive fiber.

SUMMARY OF THE INVENTION

One aspect of the invention is to provide for an improved module design that overcomes the above-described deficiencies or overcomes some of the limitations of the prior art. In this case hollow fibers are wound around a core. However we have unexpectedly discovered that the teachings of Bikson in U.S. Pat. No. 4,881,955 and Giglia of U.S. Pat. No. 5,837,033 of requiring the fibers to be of essentially equal length are not required in our invention. For example, 2 modules were manufactured, one with a fiber active length variation of 13% and one with a 70% variation. Both modules contained approximately 1875 square centimeters of active surface area. Each module was used to dry air at various pressures and what we found was that the performance of these modules was nearly identical even though the length variation between the two was a factor of nearly 6. The current state of the art of membrane module design teaches the need to avoid maldistribution of flow of both the feed gas and the sweep gas, and thus a module with a 70% length variation of the fibers would have been expected to have a lesser performance than a module with a 13% length variation. Again, in our invention, we have unexpectedly found the large variation in fiber length not to reduce performance of the module.

In laminar flow, the relative amount of flow going through a fiber is inversely related to its relative length. This is because the pressure drop of each fiber is the same and the pressure drop is proportional to the product of the volumetric flow and the length. For example if a module contained two fibers, one 1 foot long and the second one 10 feet long, the flow in the 10 foot long fiber would be 10% of the flow of the 1 foot long fiber. In turbulent flow, the pressure drop is proportional to the product of the velocity to approximately the 1.75 power times the length. In this turbulent case, the volumetric flow in the 10 foot long fiber would be about 27% of the flow in the 1 foot fiber. Certainly in our module with a length variation of 6, each fiber did not receive the same amount of feed flow, yet the difference in performance of the two modules was insignificant.

Additionally, in our module design we are not limited by the wind angle as indicated by Bikson U.S. Pat. No. 4,881,955 at col. 8, lines 53-60. In all of the prior art relating to helically wound modules, the wind angle in the active area region is constant within a layer of fibers in going from one end of the bundle to the other. With a low wind angle maintained in the tubesheet area, this would result in a significant amount of inactive fiber in the tubesheet, which adds to the amount of membrane used, an increase in capital cost of the module, and adds to the lumen and shell side pressure drops and an increase in the operating cost of the module. Additionally this reduces the tubesheet strength and would then require a larger tubesheet dimension, further increasing the membrane requirement and cost.

EXAMPLE 1

Helically wound bore-side feed internal sweep membrane air dryer modules were manufactured according to the parameters in the Table 1. The hollow fibers used were manufactured using the dry-wet phase inversion process. Water, a coagulant, was used as the bore fluid and a polymer solution containing solvent and non-solvent was pumped into the annulus of the hollow fiber spinneret. The fiber was processed according to procedures known in the art and then used to manufacture the modules. The resulting asymmetric porous hollow fiber was then coated on its inner diameter with a hydrophilic polymer.

TABLE 1

Module Design Parameters

|  | Length Variation | Average Active Length (cm) | Standard Deviation in Length (cm) | Active Surface Area (cm$^2$) |
|---|---|---|---|---|
| Module A | 13% | 172.2 | 6.05 | 1874 |
| Module B | 70% | 171.8 | 29.4 | 1878 |

During this winding process, a cylindrical core was used and the angle at which the fiber was laid down was increased in the vicinity of the tubesheet region on each end of the module such that the diameter of the fiber bundle was reduced in the tubesheet region. For each module, the diameter of the bundle near the tubesheet was about 1.1 inches, the diameter of the bundle near the midline of the module was 1.4 inches and the core used was 0.9 inches in diameter. Thus the packing fraction of the module was much less in the vicinity of the tubesheet than near the midline of the module.

Both modules were tested for their ability to remove water vapor from a compressed air stream according to the data in Table 2. Chilled mirror dewpoint hygrometers were used to measure the moisture content of the compressed air streams.

TABLE 2

Membrane Air Dryer Performance

|  | Feed Pressure (psig) | Feed Flowrate (scfm) | Sweep Flowrate (scfm) | Product Flowrate (scfm) | Percent Moisture Vapor Removed |
|---|---|---|---|---|---|
| Module A | 60 | 1.27 | 0.27 | 1.00 | 94.1% |
| Module A | 80 | 1.35 | 0.35 | 1.00 | 98.6% |
| Module A | 103.2 | 1.44 | 0.44 | 1.00 | 99.3% |
| Module B | 60.1 | 1.26 | 0.26 | 1.00 | 93.7% |
| Module B | 80 | 1.35 | 0.35 | 1.00 | 98.7% |
| Module B | 100 | 1.43 | 0.43 | 1.00 | 99.4% |

As can be seen from the data in Table 2, the performance of the 2 modules with widely varying length variations was indistinguishable.

In the present invention, we increase the wind angle near the tubesheet region (not decrease it such as in Giglia U.S. Pat. No. 5,837,033) such that the fiber enters the tubesheet more parallel to the core, and with a greatly decreased module diameter and packing fraction near the tubesheet. This feature reduces the amount of fiber within the tubesheet, reduces the pressure drop, and minimizes the parasitic loss of tubesheet integrity as a result of the presence of the fiber.

A further improvement that this increase in wind angle provides is an improved penetration of the shell side gas into the fiber bundle. For a given number of fibers, the packing fraction and bed depth in the vicinity of this wind angle increase is significantly lower that in the adjacent areas. This allows for more effective penetration of the shell side gas around all the fibers and into the bundle.

In one embodiment of the invention, a helically wound hollow fiber membrane module is provided comprising a core, with a plurality of helically wound layers of semipermeable hollow fibers wound on the core, wherein the fiber wind angle is essentially constant within one or more layers along the axial length of the module, except in one or both end or tubesheet regions, where the wind angle is increased, in at least some of the layers, relative to the essentially constant wind angle, to produce an area of decreasing diameter and packing fraction.

In an internal sweep module, where maximum tubesheet integrity is required, embedding the impervious wrap into the tubesheet would create a discontinuity in the tubesheet material and could create a failure surface in the tubesheet material. In order to provide the necessary strength a module manufacturer would have to increase the depth of the tubesheet into the fiber bundle. While this could be done, this also would increase the amount of inactive fiber area which would increase the cost of the module. In our invention, we would not embed the impervious wrap in the tubesheet. We would instead leave a gap between the end of the tubesheet and beginning of the impervious wrap and provide for a seal between the impervious wrap and the module shell. This could be done for instance by filling this gap with a expanding polyurethane foam, wrapping closed cell foam gasket around the bundle, or using any other material that fills the annular space and prevents the shell side sweep air from bypassing the fibers.

The shell side sweep air may leave the module simply through a hole in the shell or it could be collected in the core opposite the shell side sweep air injection area using passageways into the core interior in the same manner as which the shell side sweep air is injected.

Another aspect of the invention is to provide for an improved external sweep module design that overcomes the above-described deficiencies or overcomes some of the limitations of the prior art. As with the internal sweep module, it was found that with the external sweep module there was no requirement for the fibers to be of essentially equal length. This is an unexpected result in view of Bikson U.S. Pat. No. 4,881,955.

It was also found that in the external sweep module, as in the internal sweep module, as discussed hereinabove, the increase in wind angle provides an improved penetration of the sweep gas into the fiber bundle. For a given number of fibers, the packing fraction and bed depth in the vicinity of this wind angle increase is significantly lower that in the adjacent areas. This allows for more effective penetration of the sweep gas around all the fibers and into the bundle. For the impervious wrap, we do not embed it in either tubesheet, but rather, create a seal between the wrap and the shell using the methods described above.

Thus, an object of the invention is to provide a hollow fiber membrane module having the required structural integrity for all gas drying and gas transfer applications by providing a helically wound fiber module having a reduced fiber bundle diameter in the tubesheet region, with wide variations in fiber length, where needed.

Further objects and advantages of the present invention will be apparent from the following description and appended claims, reference being made to the accompanying drawings forming a part of the specification, wherein like reference characters show corresponding parts in the several views.

BRIEF DESCRIPTION OF THE DRAWINGS

FIG. 3 is a construction similar to the construction shown in FIG. 1, and having the tubesheets shown.

DESCRIPTION OF THE PREFERRED EMBODIMENTS

The term "wind-angle" is defined with regard to the module in a horizontal position. With this reference the wind-angle X is defined as the angle at which the fiber is laid across the module with respect to the vertical axis. Fibers wound at a 90° wind-angle, for example, would be parallel and straight from end to end in the module such as shown in the aforementioned U.S. Pat. Nos. 6,585,808 and 6,616,735.

A "layer of fibers" is defined as those fiber(s) that are layed down in the operation of helically winding the fibers in going from one end of the module to the other end of the module. The return of the fibers to the first end would then constitute a separate layer of fiber.

The "core" is defined as a solid or hollow axially extending body of a desired cross-section. Although the core is sometimes illustrated herein as a hollow cylinder of circular cross-section, other cross-sections, such as square, elliptical, triangular, or the like, are well within the scope of the present invention.

The methods by which hollow fibers are wound around a core are well established in the art, as are the methods and materials used to form tubesheets and methods to sever the tubesheets to expose the hollow fiber bores.

Commercially available winding apparatus is available for wrapping the hollow fiber membranes of the invention such as those manufactured by CMC of Salt Lake City, Utah. However, any commercially available winding apparatus may be used as long as the ratio of traverse (fiber lay down) speed to spindle (module) rotation speed can be controlled. A computer control of these parameters is preferred, but not necessary.

It is preferred that the diameter of the hollow fibers used in the present invention is approximately 500 microns in diameter, but any fiber diameter may be used, depending on the application requirements. Depending upon the intended use, one selects hollow fibers having the appropriate chemical structure, dimensions, and pore diameter sizes. Preparation of such hollow fibers are well known to those of ordinary skill in the art and one can use either a dense wall, porous, asymmetric, or composite membrane in constructing the hollow fiber membrane gas dehydration apparatus of the present invention. The material of which the hollow fibers are made will depend upon the particular application.

Figure 1:
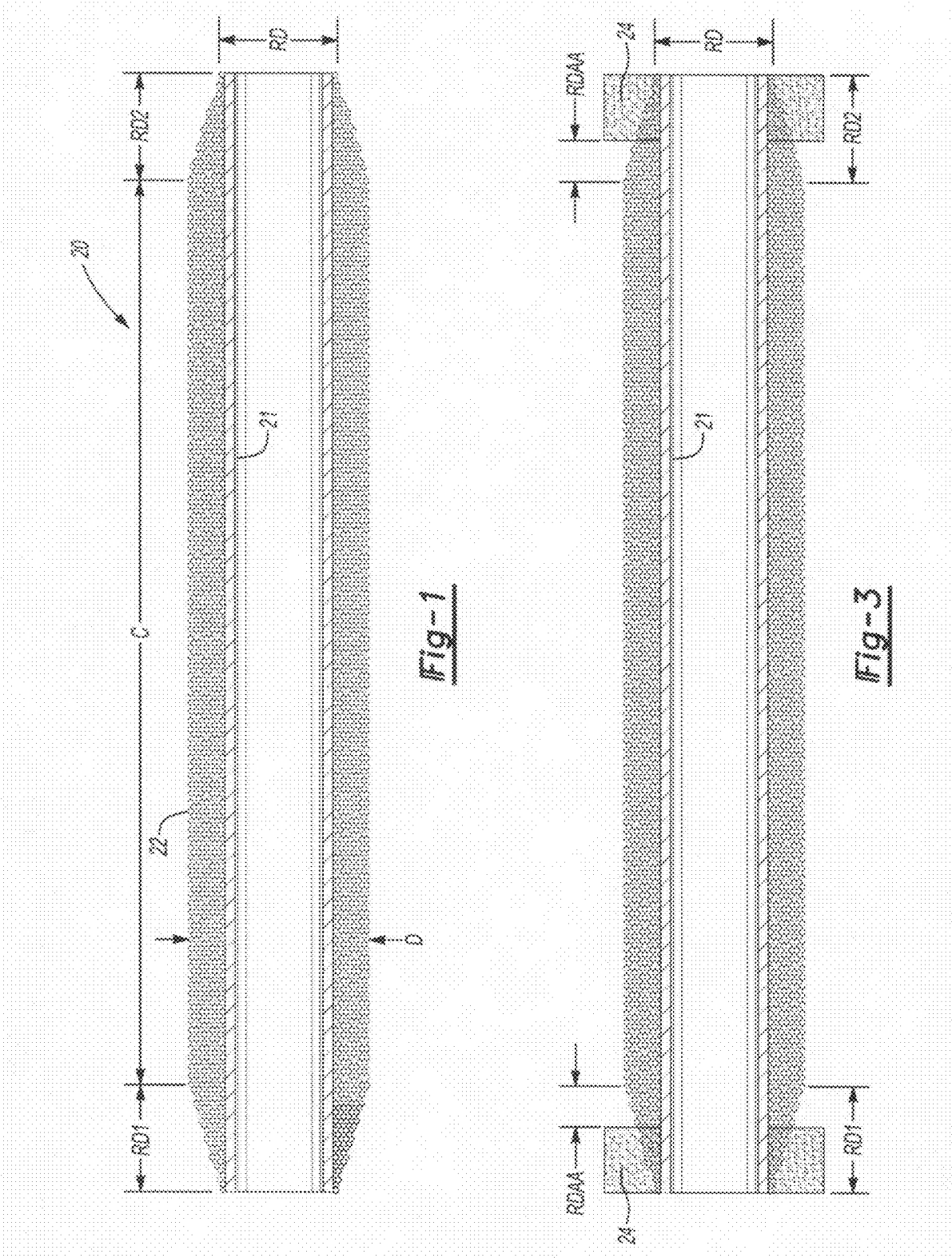
FIG. 1 is an elevational, sectional, view of a construction embodying the present invention.
Figure 2:
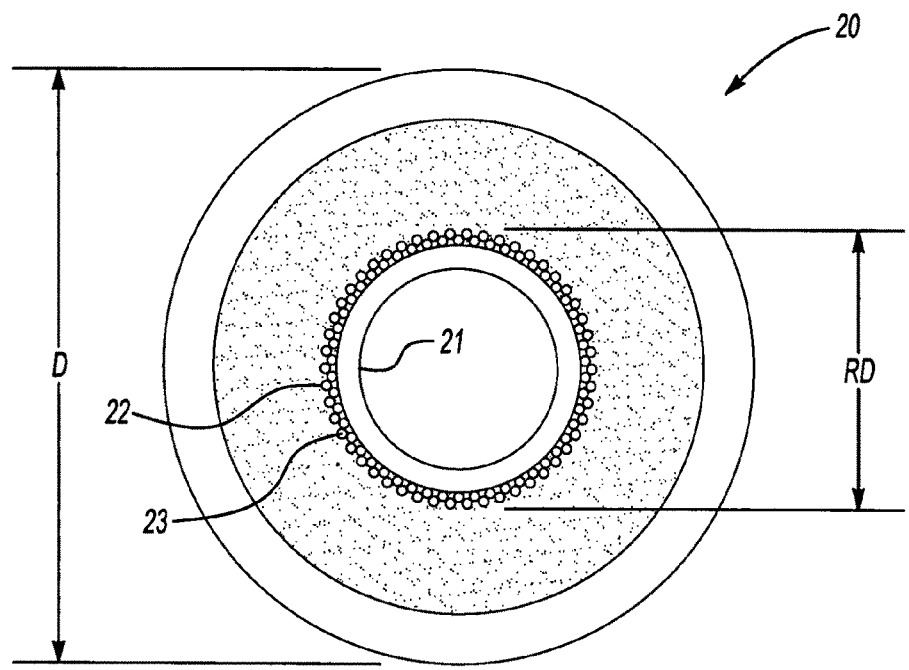
FIG. 2 is an end view of the construction shown in FIG. 1.

Referring to FIGS. 1-2, there is shown a hollow fiber membrane module 20 embodying the construction of the present invention. The module 20 comprises a core 21 having a hollow membrane fiber 22 helically wound on the 21 until the desired diameter D of the module is reached, except for the diameter in the first end region RD1, which will decrease from a diameter D to a diameter less than D. If a second region of reduced diameter RD2 is desired, it may be provided at the other end of the module 20 as illustrated in FIG. 1. It should be understood that both embodiments, as well as any other embodiments having additional regions of reduced diameter, are well within the scope of the present invention.

In order to produce such a construction, the hollow membrane fiber 22 is laid on the core 21. The rate of traverse of the fiber 22 will vary depending on the region the fiber is being laid. In end region RD1 or RD2, the rate of traverse is approximately six (6) inches per second. In the central or active region the rate is approximately one (1) inch per second, thus, the rate of lay down in an end region is much larger than in a central region. A ratio of 6 to 1.

It can be understood that the ratio of lay down can vary widely depending on the application and still be acceptable as long as the ratio of lay down in the end regions increases sufficiently to result in a reduction in diameter of the end region to a diameter less that the diameter D of the central or active region C. Depending on the application, the reduced diameter RD may be only somewhat less than diameter D, or may be substantially the diameter of the core. Any configuration that has a central or active region C of a constant area adjoining an area of reduced diameter RD is well within the scope of the present invention. While it is preferred that the diameter reduce uniformly from a first end adjacent the central region C to the end of the region of reduced diameter RD, other configurations are possible.

It should be understood that the wind angle need not be the same for all layers of the hollow membrane fiber 22, nor does the rate of traverse in the end region(s) (R1, R2) need to vary in all layers.

Figure 3A:
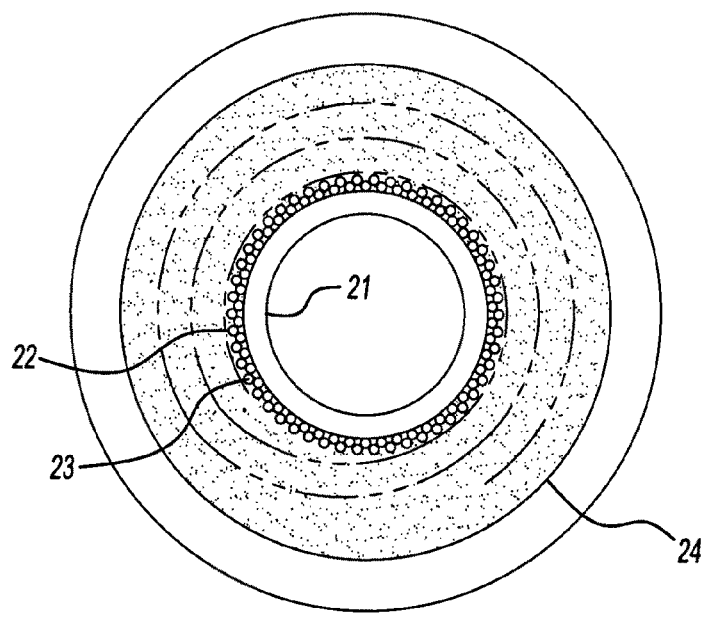
FIG. 3A is an end view of the construction shown in FIG. 3

Referring to FIGS. 3 and 3A, after the core is wound to the desired dimensions, the tubesheet(s) 24 are potted on. Any of the methods of potting on tubesheet(s), and any potting material known in the art may be used in producing the present invention. The potting material may vary depending on the application. After the tubesheet(s) 24 are cured, they are cut, exposing the fiber lumen. Since the fiber 22 was wound at an angle, and the tubesheet(s) 24 were cut off flat, the lumens 23 are somewhat elliptical in shape, although this is difficult to see in FIG. 3a.

It is preferable, for improved flow, that the tubesheet(s) 24 do not cover the entire reduced diameter region. Any area not covered by the tubesheet(s) RDAA is an active area, and will count for purposes of computation of fiber length.

Figure 4:
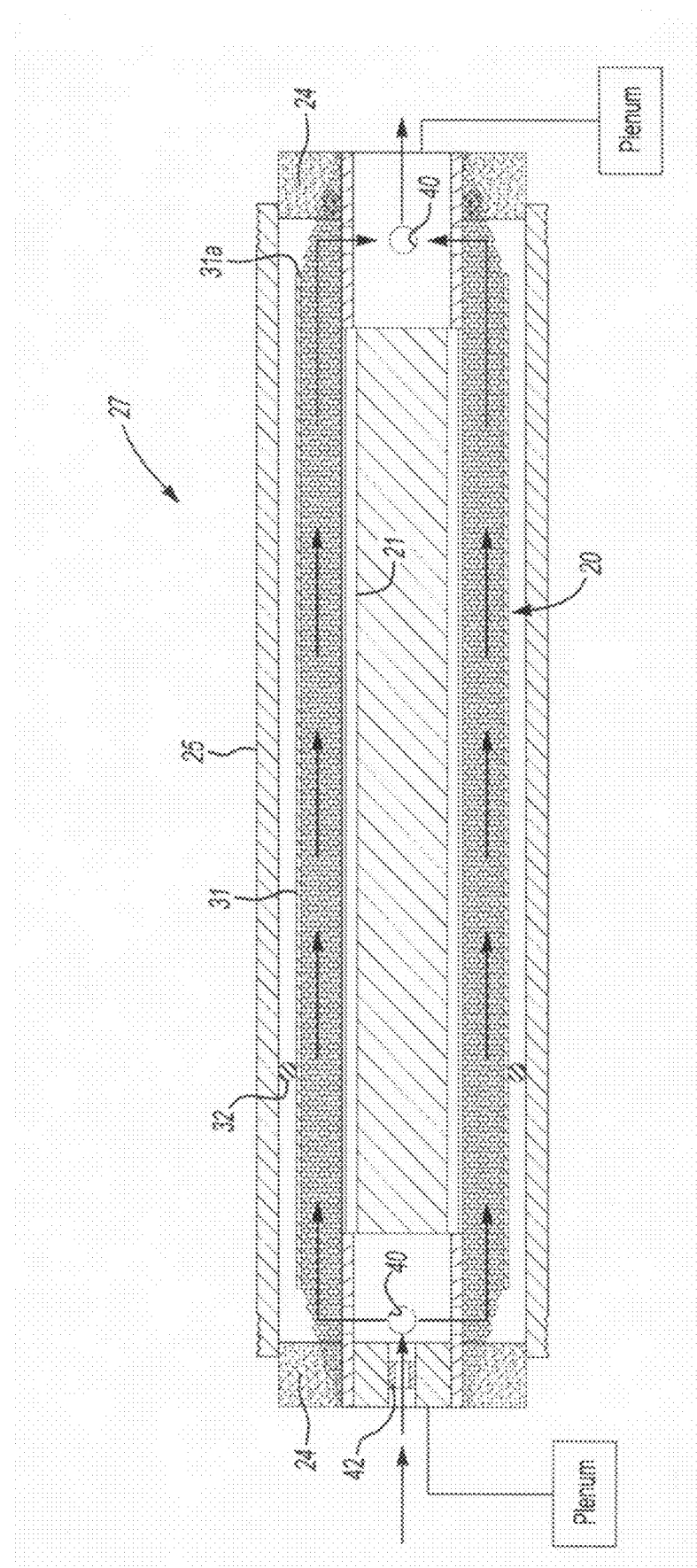
FIG. 4 is a schematic view of an internal sweep, bore-side feed, hollow fiber membrane module, having sweep collection in the core, and embodying the construction of the present invention.
Figure 5:
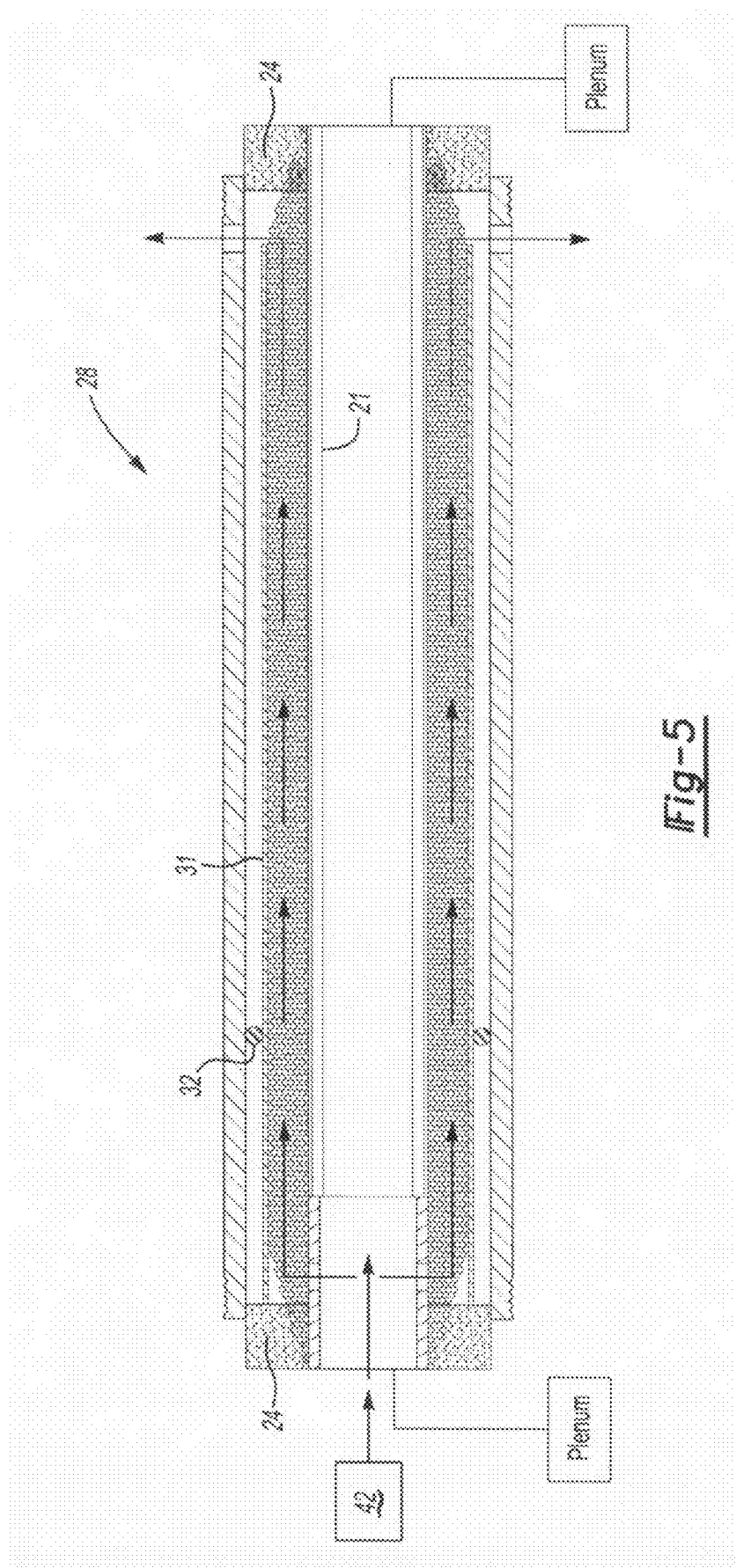
FIG. 5 is a schematic view of an internal sweep, bore-side feed, hollow fiber membrane module embodying the construction of the present invention.
Figure 6:
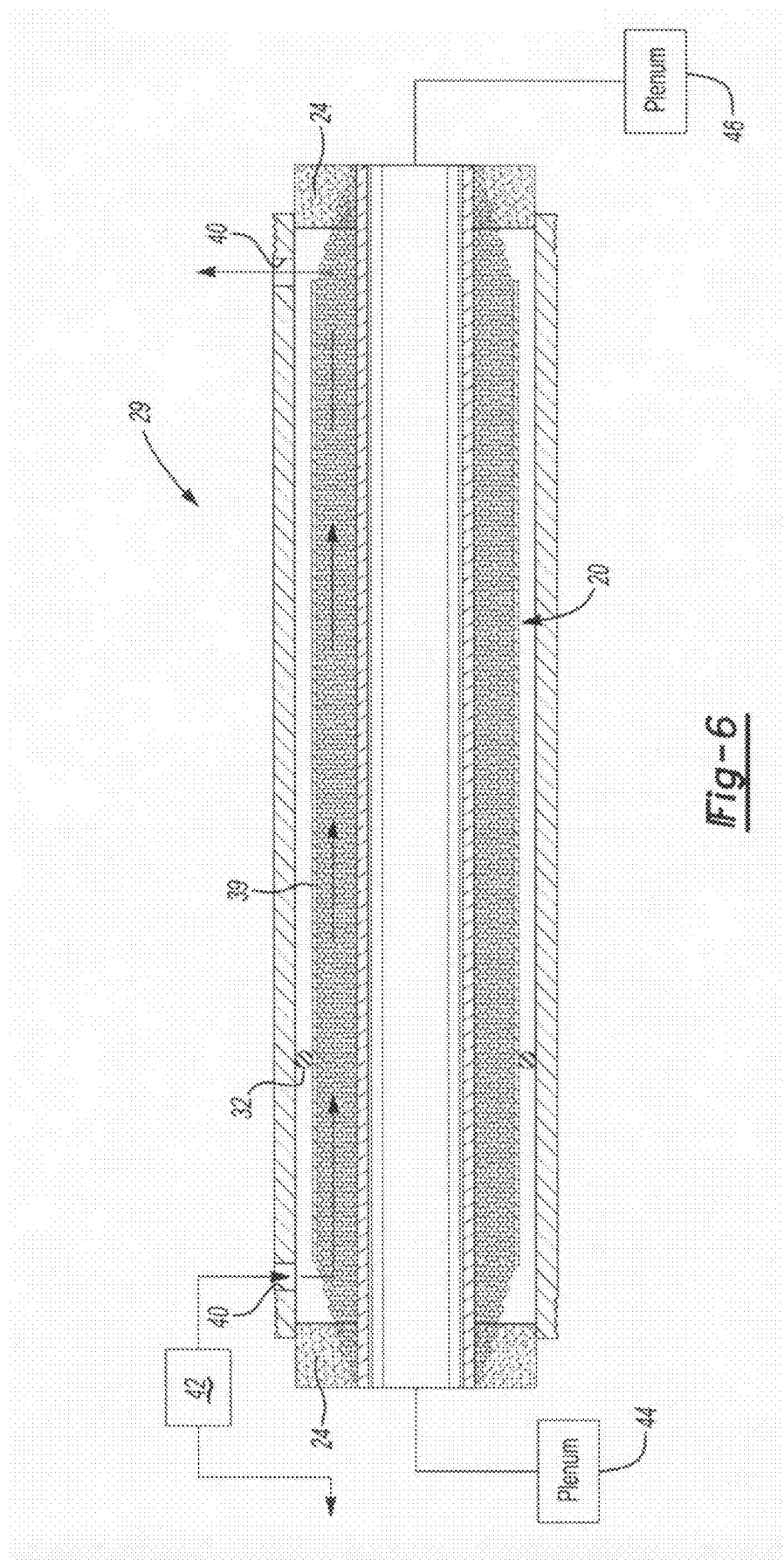
FIG. 6 is a schematic view of an external sweep, bore-side feed, hollow fiber membrane module embodying the construction of the present invention.

Referring now to FIGS. 4-6, the module so produced can be used to produce either an interior sweep bore side feed module with 27, or without 28, sweep collection in the core, or an external sweep, bore side feed, module 29. In either case, it is necessary to wrap the fiber bundle produced in an impervious wrap 31 for purposes to be explained hereinafter. It is important for the internal sweep bore side feed modules 27, 28 that the entire module between the tubesheet(s) 24 be covered with this wrap, except on one end which is to be opposite the sweep inlet in the module. Alternatively for increased tubesheet strength, the impervious wrap may cover the entire fiber bundle except in active area adjacent the tubesheet(s). In this case, a seal 32 would be placed between the impervious wrap and the shell.

It is important to the present invention that the impervious wrap not be imbedded in the tubesheet(s) 24 but be sealed instead to the shell, which may be done by any method known in the art such as by imbedding the wrap between the tubesheet and the shell, or providing a gasket or other seal between the tubesheet and the shell.

In the internal sweep module 28, optionally there may be placed a seal 32 between the wrap and the shell. The core 21 is provided with a plurality of sweep holes 40 proximate the tubesheet(s) 24 to provide for the entry of sweep gas through the sweep orifice 33.

Because of the impervious wrap 31, and optionally because of the seal 32, the sweep gas entering through the sweep orifice 31 will travel through the helically wound fibers 24 until it reaches the distal end 31A of the impervious wrap after, which it will exit out of the sweep hole to atmosphere or other pressure depending upon the application. Since the module is sealed in the shell, the sweep gas is constrained to exit at the sweep hole 40.

The wet feed gas coming in the lumens 23 embedded in the first tubesheet 24A will travel through the lumens of the helically wound fiber and exit out the module at the end opposite the sweep entry because of the counter current flow arrangement of the module. It should be understood that co-current flow configurations can also be used in which case the dry gas would enter at the same end of the module as the sweep gas entry.

Referring now to FIG. 6, there is shown the use of the present invention to produce an external sweep, bore side feed, hollow fiber membrane module. In this embodiment of the present invention the module 20 may be wound identically to the module shown in FIG. 3, but the impervious wrap, now identified by the numeral 39 for clarity, is open for a predetermined distance at each end of the module.

It is preferred that the impervious wrap end in the region of the sweep holes 40, but this is not necessary. If desired an orifice can be placed in the sweep inlet circuit to limit the flow of sweep gas through the exterior sweep module 29. Wet gas will enter the first plenum 46, pass through the lumens 23 of the fibers 22 and exit out the second and dry gas will exit out the second plenum 44.

Figure 7:
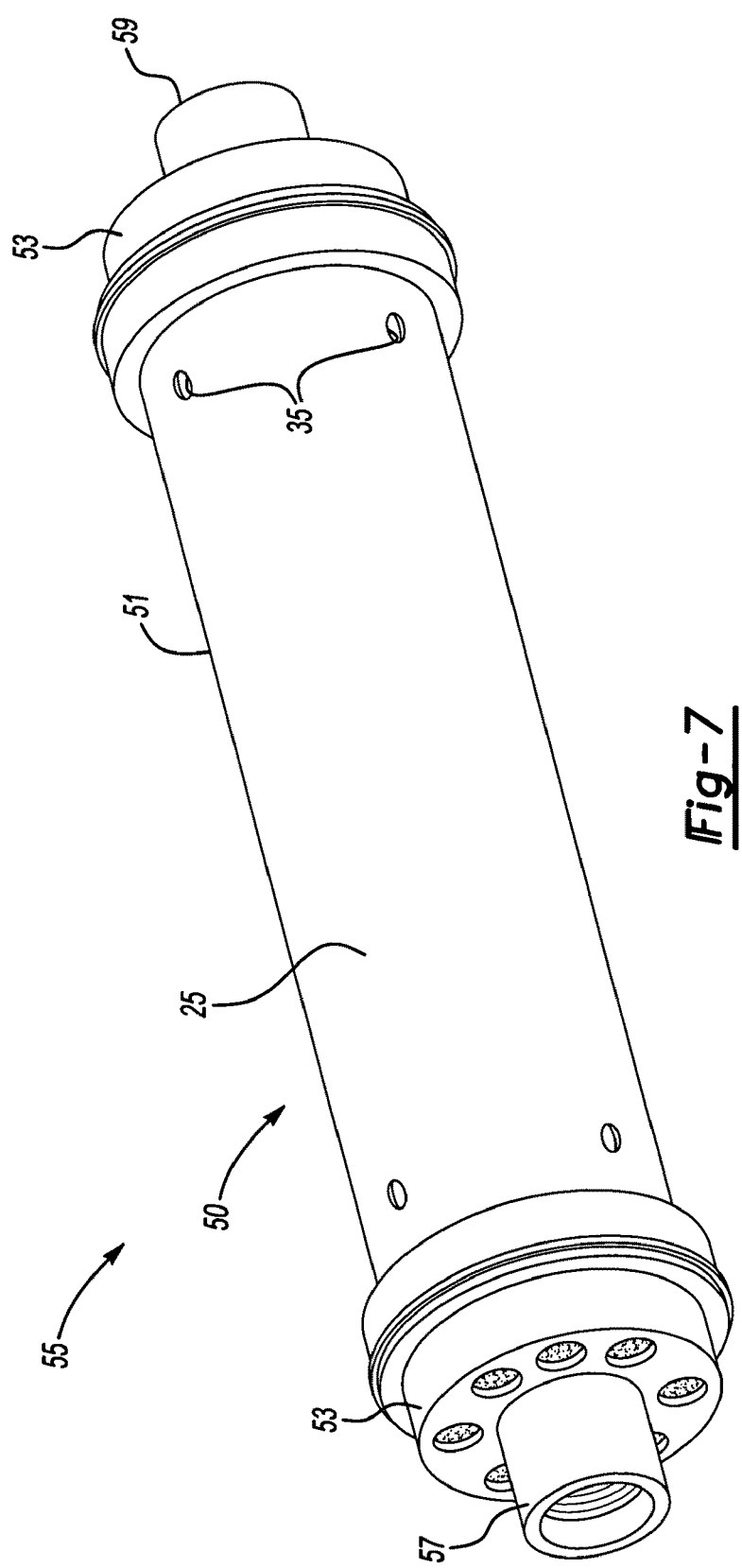
FIG. 7 is a perspective view of the construction shown in FIG. 4. mounted in a module housing.

Referring to FIG. 7, typically a module 20, 29 is mounted in a module housing generally designated by the numeral 50. The shell 25 may serve as the tubular portion 51 of the housing 50 or the module 20 including the shell 25 may slip inside the tubular portion 51 of the housing 50. In either construction, a pair of endcaps 53 will be sealingly connected to the tubular portion 51 of the housing to form the housing assembly 55. There will be an inlet 57 by which the wet gas to be dehydrated enters the module assembly 55, and an outlet 59 by which the dehydrated gas will leave. Inside each endcap 53 will be a plenum 44 (not shown). The configuration of the tubular portion 51 and endcaps 53 will vary depending on which type of module 27-29 is being used.

Figure 8:
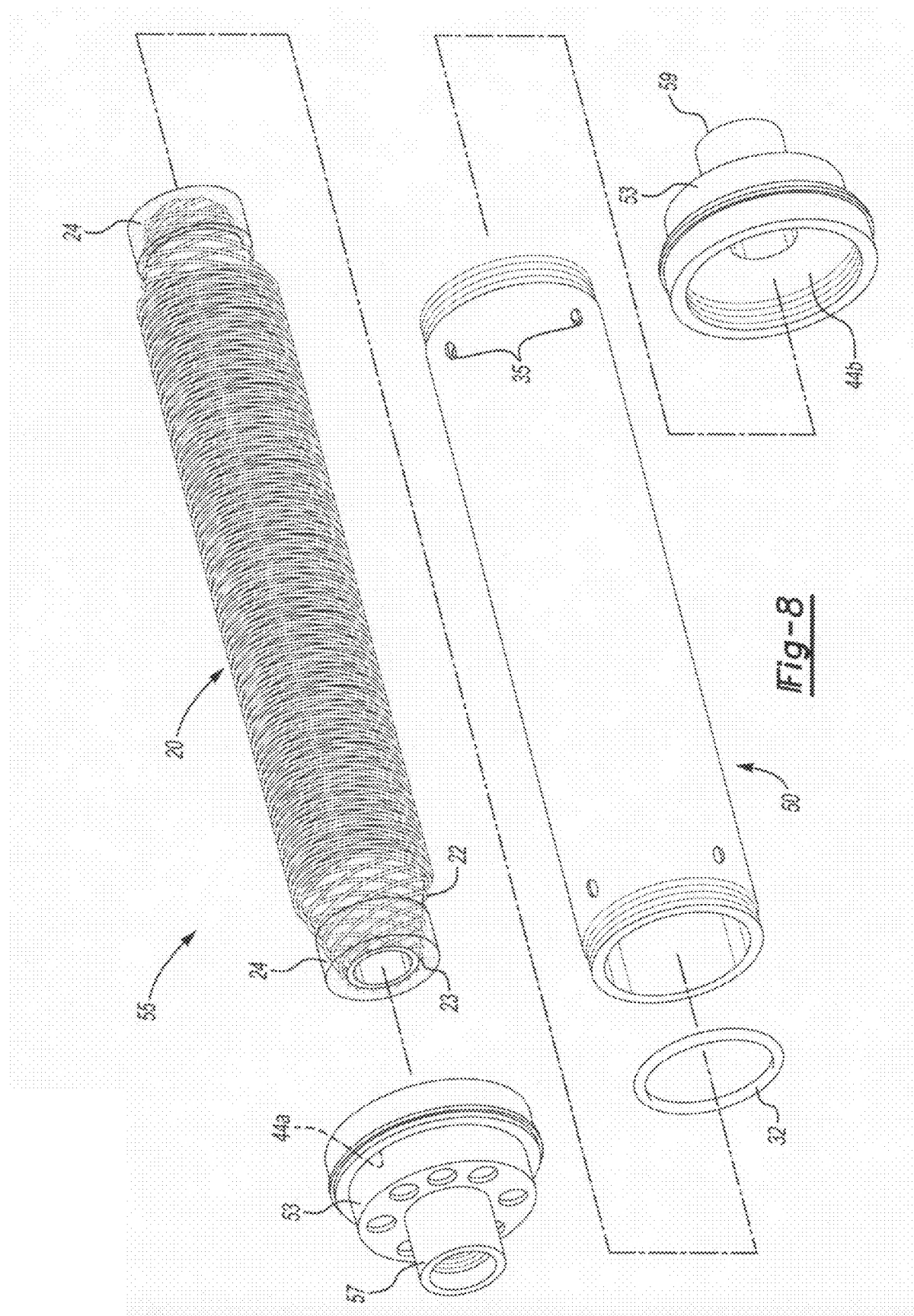
FIG. 8 is an exploded, perspective, view of the construction shown in FIG. 7.

An exploded view of the housing assembly 55 is shown in FIG. 8. The housing assembly 55 comprises a module housing 50 having sweep openings and sweep outlets. Endcaps 53 screw onto the end of the module housing 50 to seal the hollow membrane module 20 having tubesheets 24 into the housing. The endcaps 53 need not screw onto the tubular portion, but can be affixed by adhesive, sonic welding, or other means known in the art.

The impervious wrap 31 (not shown in this view) is sealed to the housing by the gasket 32. A plenum 44 is provided interiorly of endcap 53 to admit the wet gas to be dehydrated through inlet 57. The wet gas enters the inlet plenum 44A, passes through the lumens 23 of the fibers 22, and exits out the other end of the hollow fiber membrane module 20 into the exit plenum 44B, and therethrough, to the outlet 59.

Figure 9:
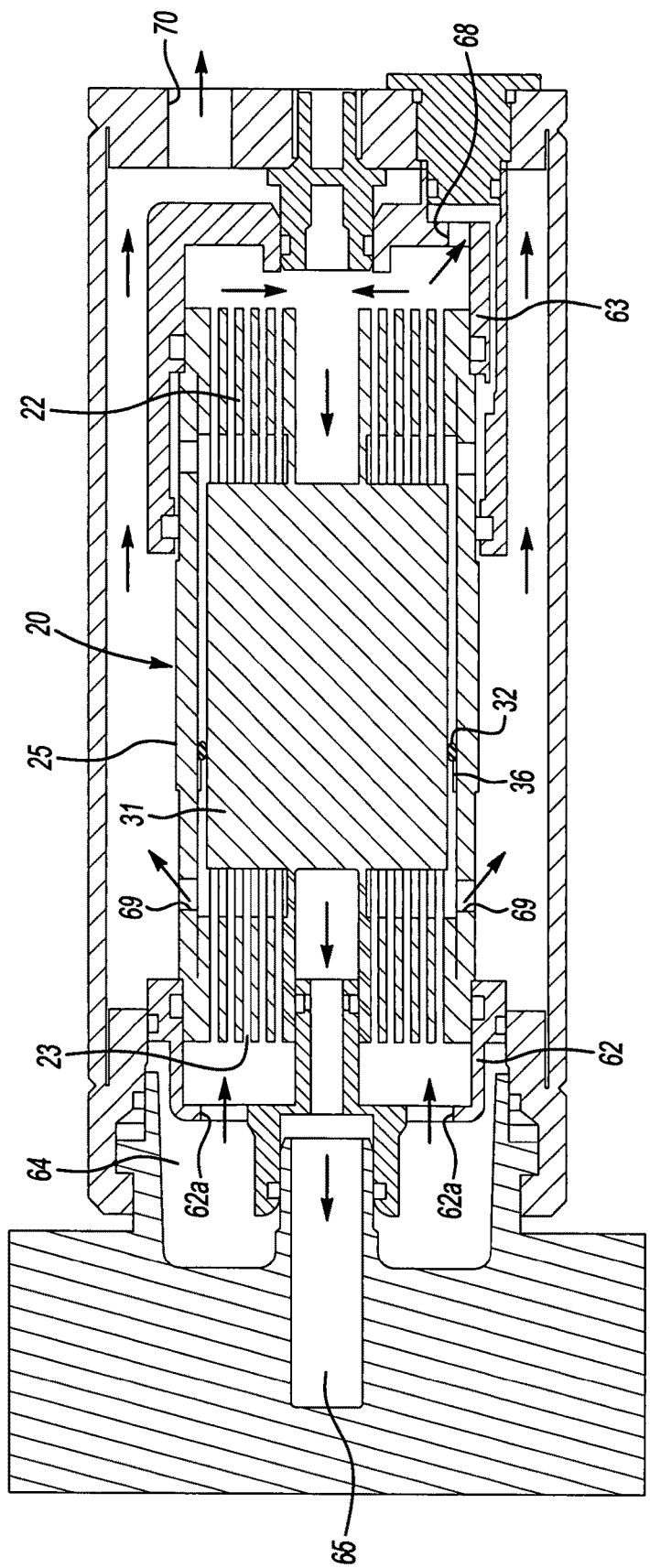
FIG. 9 is an elevational, sectional view of a reverse flow hollow fiber membrane module mounted in a housing and using part of the dehydrated gas as a sweep gas.

Referring now to FIG. 9, there is shown an example of a helically wound bundle that is placed in a housing such that the inlet and outlet compressed gas port are in alignment such as in typical inline filter housings used for example in the coalescing of aerosols. For ease of illustration, the tubesheet(s) 24 are not shown and straight fibers having a wind angle of 90° are illustrated. The hollow membrane module 20 having hollow fibers 22 and tubesheet(s) 24 (not shown) is placed inside of shell 25. The impervious wrap 31 is sealed to the shell 25 by seal 32. If desired, a self-expanding foam 36 may be introduced through an opening (not shown) to further seal the impervious wrap 31 to the shell 25.

The hollow fiber membrane module 20 has a pair of modified endcaps identified by the numerals 62 and 63, which allows it to be mounted inside a filter housing 60 having a housing inlet 64 and a housing outlet 65. The wet gas to be dehydrated enters the housing inlet 64 and passes through the opening 62A in the first endcap 62, passes through the lumens 23 of the fibers 22 and exits through the lumens 23 adjacent the endcap 63 which is especially constructed to deflect and return most gas through the core 21 and out the first endcap 62 into the housing outlet 65. However, a portion of the dry gas is allowed to pass through the special sweep inlet 68, where it passes around the fibers 22, under the impervious wrap 20, and out the special sweep outlet holes 69 and out the housing sweep outlet 70.

By carefully considering the problems in the art, an improved hollow fiber membrane module has been provided.

What is claimed is:

1. A helically wound hollow fiber membrane module comprising:
   (a) a core;
   (b) a plurality of helically wound layers of semi-permeable hollow fibers wound on the core, wherein the fiber wind angle with respect to any one layer of fibers is essentially constant along the axial length of the module, except in one or both end or tubesheet regions, where the wind angle is increased, in at least some of the layers relative to the essentially constant wind angle, to produce an area of decreasing diameter and packing fraction and wherein the length of the fibers in different layers of fiber along the axial length of the module vary by twenty percent or more.

2. The helically wound hollow fiber membrane module of claim 1, wherein the diameter of the module at the beginning of the one or both end regions is substantially the diameter of the hollow fiber membrane module at the central active region, and is less than the diameter of the central active region at the other end of the one or both end or tubesheet regions.

3. The helically wound hollow fiber membrane module of claim 2, wherein the diameter of the module at the other end of the one or both end regions is substantially the diameter of the core.

4. The helically wound hollow fiber membrane module of claim 2, further comprising at least one end or tubesheet region, a portion of which is an active region, and a central active region.

5. The helically wound hollow fiber membrane module of claim 4, wherein a potted on end cap covers at least a portion of the at least one tubesheet region.

6. The helically wound hollow fiber membrane module of claim 5, wherein the hollow fiber membrane module has a tubesheet region at each end, with an active region extending between the tubesheet regions, wherein a potted on endcap is provided on each of the tubesheet regions, and each potted on endcap covers at least a portion of its respective tubesheet region.

7. The helically wound hollow fiber membrane module of claim 5, wherein the module is covered with a closely conforming barrier material which is impervious to gas and extends over the entirety of the module except for a non-covered region adjacent the at least one tubesheet region.

8. The helically wound hollow fiber membrane module of claim 6, wherein the module is covered with a closely conforming barrier material which is impervious to gas and extends over the entirety of the module.

9. The helically wound hollow fiber membrane module of claim 6, wherein the module is covered with a closely conforming barrier material which is impervious to gas and extends over the entirety of the module except for a non-covered region adjacent the at least one tubesheet region.

10. The helically wound hollow fiber membrane module of claim 6, wherein the module is covered with a closely conforming barrier material which is impervious to gas and extends over the entirety of the module.

11. The helically wound hollow fiber membrane module of claim 7 sealingly mounted inside a shell.

12. The helically wound hollow fiber membrane module of claim 9 sealingly mounted in side a shell.

13. The helically wound hollow fiber membrane module of claim 11, wherein there is a seal between the impervious barrier material and the shell.

14. The helically wound hollow fiber membrane module of claim 12, wherein there is a seal between the impervious barrier material and the shell.

15. An internal sweep, bore-side feed, helically wound hollow fiber membrane module comprising:
   (a) the helically wound hollow fiber membrane module of claim 13, wherein the hollow core is cylindrical and is open at one end of the module for the introduction of sweep gas, and a plurality of sweep holes are provided in the hollow core proximate the active region to allow sweep gas to surround the outside of the fibers in the area defined between the core, the inside of the shell and the endcaps: and,
   (b) At least one opening provided in the shell to allow the sweep gas to escape.

16. The construction defined in claim 15 further comprising a sweep orifice in the hollow core to limit the amount of sweep gas entering the core.

17. The construction defined in claim 15, further comprising a seal between the gas impervious material and the interior of the shell.

18. An external sweep, bore-side feed, module comprising:
   (a) the helically wound hollow fiber membrane module of claim 13, wherein the closely conforming barrier material extends over the entirety of the module except for a non-covered region adjacent both tubesheet regions;
   (b) a seal is provided between the gas impervious material and the interior of the shell;
   (c) at least one sweep inlet opening is provided adjacent one end of the shell; and
   (d) at least one sweep outlet opening is provided adjacent the other end of the shell.

19. The construction defined in claim 18, further comprising endcaps provided on each end of the shell.

20. The construction defined in claim 19, further comprising endcaps provided on each end of the shell.

21. The helically wound hollow fiber membrane module defined in claim 1, wherein the wind angle of different layers of fiber along the axial length of the module vary.

22. The external sweep, bore-side feed, module defined in claim 18, wherein the hollow core is cylindrical.

23. A helically wound hollow fiber membrane module comprising:
   (a) a core and;
   (b) a plurality of helically wound layers of semi-permeable hollow fibers wound on the core, wherein the fiber wind angle with respect to any one layer of fibers is essentially constant along the axial length of the module, except in both end or tubesheet regions, where the wind angle is increased, in at least some of the layers relative to the essentially constant wind angle, to produce an area of decreasing diameter and packing fraction and wherein the length of the fibers in different layers of fiber along the axial length of the module vary by twenty percent or more.

* * * * *